United States Patent Office 3,364,285
Patented Jan. 16, 1968

3,364,285
PROCESS FOR THE PRODUCTION OF SPIRO-
CYCLIC PHOSPHORIC ACID ESTERS
Herbert Grabhöfer, Cologne-Flittard, and Hans Ulrich,
Leverkusen, Germany, assignors to Agfa Aktienge-
sellschaft, Leverkusen, Germany, a corporation of
Germany
No Drawing. Filed May 6, 1964, Ser. No. 365,505
Claims priority, application Germany, May 18, 1963,
A 43,143
4 Claims. (Cl. 260—973)

ABSTRACT OF THE DISCLOSURE

Esterification of the cyclic partial ester

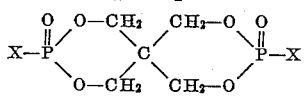

where X is halogen, by reacting it at elevated temperatures with an alcohol or phenol boiling above 100° C. in absence of solvent and continuously removing the gaseous hydrogen halide formed, as by evacuating to 1–250 mm. of mercury.

---

This invention relates to a process of producing spirocyclic phosphoric acid esters by heating alcohols with pentaerythritol esters of phosphorchloridic acids in vacuo.

The production of spirocyclic phosphoric acid esters by reacting pentaerythritol-bis-phosphoric acid monohalides of the formula:

I
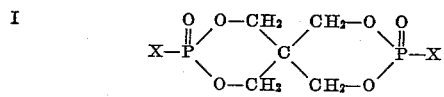

wherein X represents a halogen atom, with alcohols or phenols in organic solvents and in the presence of acid-binding agents is known. The ester-halide in which the X is chloride is also known as the pentaerythritol ester of phosphorchloridic acid.

However, this process is relatively complicated, since it involves the use of solvents and special processing steps for isolating the esters from the reaction mixture. Furthermore, the yields produced are relatively low.

It is among the objects of the present invention to provide a single step process for the production of those esters.

We now have found that esters of pentaerythritol esters of phosphorchloridic acid can be prepared in a simple manner by heating the phosphorchloridic acid of the above Formula I in vacuo with relatively involatile alcohols or phenols in the absence of solvents or acid-combining agents and with simultaneous removal of the hydrogen halide liberated in the reaction from the reaction mixture.

This discovery is all the more surprising, since it would have been expected that under these conditions the ester groupings of the pentaerythritol ester of phosphorchloridic acid would not remain stable.

After completing the reaction, any traces of hydrohalic acid which are still adsorbed by the reaction mixture can be neutralised by adding small amounts of alkaline substances.

As alcoholic reaction component there can be used aliphatic alcohols or phenols having a boiling point above 100° C. under standard pressure of 760 mm. of mercury. Suitable alcohols and phenols for performing the reaction of the invention include those of the following general formula:

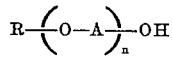

wherein: R represents an alkyl radical having at least 5 carbon atoms, aralkyl groups particularly phenylalkyl groups such as benzyl or phenylethyl, an aromatic radical, more especially a phenyl group which in turn may be substituted preferably with aliphatic radicals having 1 to 20 carbon atoms, or a hydrogen atom if $n$ stands for an integer equal to or greater than 1. A represents a divalent aliphatic radical with 2 to 6 preferably 2–4 carbon atoms, more especially an ethylene radical; $n$ is 0 or an integer equal to or greater than 1, advantageously 4 to 50.

Specific compounds of this type are aliphatic monohydric alcohols with 8–20 carbon atoms, phenyl substituted aliphatic alcohols the phenyl group of which can be substituted by alkyl radicals especially those having between 6 and 18 carbon atoms, phenols preferably monophenols which may be substituted preferably in the p-position by alkyl radicals with 6 to 18 carbon atoms, xylenols, polyhydric aliphatic alcohols preferably glycols with 2 to 12 carbon atoms, polyalkylene glycols, the alkylene group of which may have 2–6 carbon atoms, more especially polyethylene glycols with 2 to 100 and advantageously 4 to 50 ethylene oxide units, glycols and polyalkylene glycols in which a hydroxy group is etherified by reaction with an aliphatic alcohol with 1 to 20 carbon atoms, with a phenol which may be substituted by aliphatic radicals, and with cycloaliphatic or araliphatic alcohols, such as cyclopentyl or cyclohexylalcohol, benzylalcohol or phenylethylalcohol.

In performing the reaction, the monohydric alcohols and phenols are generally used in quantities of 2 mols per mol of the pentaerythritol ester of phosphorchloridic acid of the above Formula I, whereas the divalent alcohols are generally used in quantities from 1 to 2 mols per mol of the compound according to the above Formula I. The reaction can be carried out at temperatures from about 50–250° C. preferably 80 to 150° C. and in a vacuum. Generally the reaction can be accomplished in a vacuum of about 1–250 preferably 10–50 mm. of mercury. The yields produced are practically quantitative.

The esterification products obtained by the present process can be represented by the following Formula III:

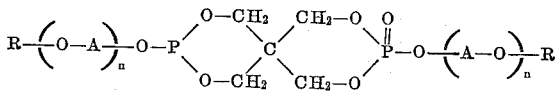

in which R, A and $n$ have the same meaning as in Formula II.

Depending on the proportions and reaction conditions which are used, it is possible to prepare condensation products in which one of the terminal groups can be a

group, which thereafter can be esterified. When the reaction components are used in approximately equimolar quantities, it is possible to produce substantially higher degrees of polycondensation than with the known processes.

The pentaerythritol phosphoric acid esters prepared by the process of the invention are suitable as softening agents for gelatine in the production of photographic layers, as chemical sensitisers for photographic silver halide emulsion layers, as antistatic agents for articles of hydrophilic and hydrophobic products, such as photographic films, and also as additives for the production of flame-resistant shaped elements.

Example 1

900 g. of dodecyl oxyhexaethylene glycol and 300 g. of pentaerythritolester of phosphorchloridic acid are heated in a vacuum of 15 mm. and while stirring to 100–120° C., hydrochloric acid escapes in large quantities. After the reaction is completed, the reaction mixture is made neutral with a methanolic sodium alcoholate solution. The methanol is removed again in vacuo. Yield: 1040 g. of a waxy, amber-colored substance of the formula:

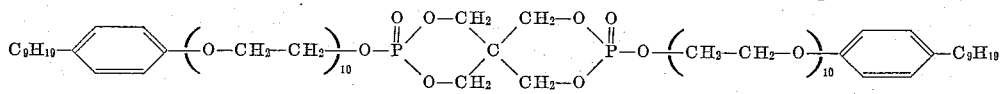

Example 2

1320 g. of p-nonyl phenoxy decaethylene glycol and 300 g. of the pentaerythritolester of phosphorchloridic acid are reacted in accordance with the method of Example 1 to give 1540 g. of a compound of the formula:

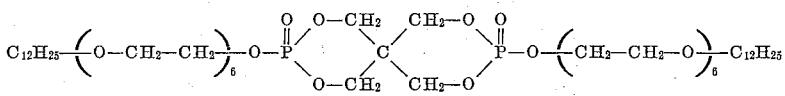

Example 3

414 g. of nonaethylene glycol and 297 g. of the pentaerythritol ester of phosphorchloridic acid are heated under a vacuum of 15 mm. Hg with stirring for 4–5 hours to 100–120° C. until evolution of acid has clearly subsided. The substance is then diluted with 500 cc. of methanol and adjusted to neutrality with a 10% methanolic sodium methylate solution. After distilling off the methanol, 650 g. of a highly viscous condensation product are obtained which can be used without further purification for photographic purposes. From the ratio of the starting products and the molecular weight of 900 determined by osmotic methods, the following formula can be assumed for the final product:

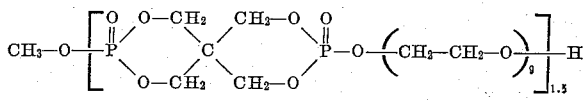

Example 4

316 g. of n-decanol and 297 g. of the pentaerythritolester of phosphorchloridic acid are heated as indicated in Example 1 for 4 hours in vacuo to 100° C. The yield is 520 g. of a waxy, colorless product of the formula:

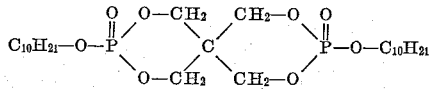

Example 5

244 g. of xylenol and 297 g. of the pentaerythritol ester of phosphorchloridic acid are heated to 100° C. as previously described in a vacuum of 15 mm. Hg. for 4 to 5 hours. Hydrochloric acid is split off. Yield 470 g. of white crystals with a melting point of 120–125° C. The final product corresponds to the formula:

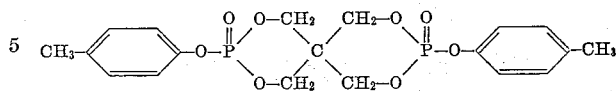

We claim:

1. A process for the production of spirocyclic pentaerythritol esters of phosphoric acid which comprises the steps of preparing a mixture consisting essentially of pentaerythritol-bis-phosphoric acid monochloride and an alcohol or phenol having a boiling point above 100° C., the mixture having about 1 mol of the chloride for every 1 to 2 mols of the alcohol or phenol, heating the mixture directly to a temperature between 80 and 150° C. in vacuo, and continuously removing the gaseous hydrochloric acid which is set free.

2. A process as defined in claim 1 wherein the compound having a boiling point of above 100° C. has the following formula:

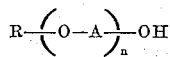

wherein:
R is a member of the group consisting of alkyl having 5 to 20 carbon atoms, a phenyl, phenyl substituted with alkyl groups having up to 20 carbon atoms, phenylalkyl and hydrogen if $n$ is an integer of at least 1;
A is a divalent alkylene group having between 2 and 4 carbon atoms; and
$n$ is 0 or an integer from 1 to 100.

3. A process as defined in claim 2, wherein the compound boiling above 100° C. is a polyethylene glycol.

4. A process as defined in claim 1 wherein the reaction is conducted in a vacuum of between 10 and 50 mm. of mercury.

References Cited

UNITED STATES PATENTS

| | | | |
|---|---|---|---|
| 2,516,168 | 7/1950 | Woodstock | 260—973 X |
| 2,650,935 | 9/1953 | Gamrath et al. | 260—973 X |
| 2,661,366 | 12/1953 | Gamrath et al. | 260—973 X |

CHARLES B. PARKER, *Primary Examiner.*

A. H. SUTTO, *Assistant Examiner.*